United States Patent
Choi et al.

(10) Patent No.: US 12,149,092 B2
(45) Date of Patent: Nov. 19, 2024

(54) INFORMATION HANDLING SYSTEM HOUSING INTEGRATED WIRELESS CHARGING COIL IN HOUSING BOTTOM SIDE

(71) Applicant: Dell Products L.P., Round Rock, TX (US)

(72) Inventors: Duck-Soo Choi, Georgetown, TX (US); Peng Lip Goh, Singapore (SG); Deeder M. Aurongzeb, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 760 days.

(21) Appl. No.: 17/372,755

(22) Filed: Jul. 12, 2021

(65) Prior Publication Data
US 2023/0012464 A1    Jan. 12, 2023

(51) Int. Cl.
| | |
|---|---|
| H02J 50/00 | (2016.01) |
| G06F 1/16 | (2006.01) |
| G06F 1/20 | (2006.01) |
| H02J 7/02 | (2016.01) |
| H02J 50/10 | (2016.01) |

(52) U.S. Cl.
CPC .......... *H02J 50/005* (2020.01); *G06F 1/1613* (2013.01); *G06F 1/203* (2013.01); *H02J 7/02* (2013.01); *H02J 50/10* (2016.02)

(58) Field of Classification Search
None
See application file for complete search history.

(56) References Cited

U.S. PATENT DOCUMENTS

| | | | | |
|---|---|---|---|---|
| 10,002,709 B2 * | 6/2018 | Hu | ........................ | H01F 27/363 |
| 10,672,556 B2 * | 6/2020 | Hu | ........................ | C03C 17/10 |
| 10,861,643 B2 * | 12/2020 | Lin | ....................... | H02J 7/0042 |
| 2021/0091590 A1 * | 3/2021 | Liang | .................... | H01F 27/327 |

OTHER PUBLICATIONS

M. Spoonauer, "HP Envy 14 Spectre Hands-on: First Glass Ultrabook," downloaded from https://www.laptopmag.com/articles/hp-envy-14-spectre-hands-on-first-glass-ultrabook-coming-february-8th-for-1399 on Jul. 15, 2021, 11 pages, published on Jan. 9, 2012.

(Continued)

*Primary Examiner* — Leigh M Garbowski
(74) *Attorney, Agent, or Firm* — Zagorin Cave LLP; Robert W. Holland

(57) ABSTRACT

A portable information handling system glass ceramic housing integrates plural wireless charging coils on one side and plural coil interface traces on an opposing side that interface with conductive material disposed in through glass via openings. Conductive contacts interfaced with the coil interface traces and exposed at the glass ceramic housing interior couple to a printed circuit board assembly through pogo pins that bias against the conductive contacts to communicate power from the wireless charging coils to the charger of the information handling system. The conductive contacts co-locate with a logo etched into the glass ceramic housing to provide an aesthetically pleasing wireless charging solution.

20 Claims, 12 Drawing Sheets

(56) References Cited

OTHER PUBLICATIONS

Nokia, "Delivering a monetizable 5G service: cloud gaming" downloaded from https://www.nokia.com/networks/5g/gaming/ on Jul. 15, 2021, 5 pages.

Telia Company, "5G for Esports Tested," downloaded from https://www.teliacompany.com/en/news/news-articles/2018/5g-speeds-for-esports-tested/ on Jul. 15, 2021, 3 pages.

Corning, "Glass is Better for Wireless Charging," downloaded from https://www.corning.com/gorillaglass/worldwide/en/glass-is-better-for-wireless-charging.html on Jul. 15, 2021, 3 pages.

Nokia, "Smart Node Femtocells," downloaded from https://www.nokia.com/networks/solutions/femtocells/ on Jul. 15, 2021, 4 pages.

Researchgate, "60 GHz dipole antenna for short range indoor communication systems," downloaded from https://www.researchgate.net/publication/261233540_60_GHz_dipole_antenna_for_short_range_indoor_communication_systems on Jul. 15, 2021, 2 pages, Abstract only.

Lenovo, "Laptop Docking Stations," downloaded from https://www.lenovo.com/us/en/accessories-and-monitors/docking/dc/docking . . . on Jul. 15, 2021, 6 pages.

CNET, "HP Advanced Wireless Docking Station—wireless docking station—VGA, 2 x DP—802.11ad (WiGig) Specs & Prices," downloaded from https://www.cnet.com/products/hp-advanced-wireless-docking-station-wireless-docking-station-vga-2-x-dp/ on Jul. 15, 2021, 6 pages.

M. D. Bartlett et al., "High thermal conductivity in soft elastomers with elongated liquid metal inclusions," downloaded from https://www.pnas.org/content/114/9/2143 on Jul. 15, 2021, 27 pages.

Arieca, "Modern Materials for a Connected Society," downloaded from arieca.com, 7 pages, on Jul. 15, 2021.

C. Yan et al., "Stretchable Graphene Thermistor with Tunable Thermal Index," downloaded from https://figshare.com/articles/journal_contribution/Stretchable_Graphene_Thermistor_with_Tunable_Thermal_Index/2193646 on Jul. 15, 2021, 7 pages.

Semantic Scholar, "Stretchable Graphene Thermistor with Tunable Thermal Index," downloaded from https://www.semanticscholar.org/paper/Stretchable-graphene-thermistor-with-tunable-index.-Yan-Wang/1d03bb564b4713a2b69a42f31a0ae6f1d5cf2bff on Jul. 15, 2021, 4 pages, Abstract only.

S. Byford et al., The LG G8 has a vibrating OLED screen for a speaker, downloaded from https://www.theverge.com/2019/2/13/18224394/lg-g8-thinq-oled-speaker-quad-dac-boombox on Jul. 15, 2021, 2 pages.

\* cited by examiner

INFORMATION HANDLING SYSTEM HOUSING INTEGRATED WIRELESS CHARGING COIL IN HOUSING BOTTOM SIDE

BACKGROUND OF THE INVENTION

Field of the Invention

The present invention relates in general to the field of portable information handling systems, and more particularly to an information handling system housing integrated wireless charging coil in housing bottom side.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components and a keyboard and rotationally couples with hinges to a lid housing portion that integrates a display. In a clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility.

Generally, end users prefer portable information handling systems with a minimal footprint and weight, which has driven manufacturers to provide a given processing capability in as minimalist of a housing as possible. Typically, an end user selects a display size, which drives the housing width and length, and then selects a particular information handling that meets a desired performance level and housing thickness, also known as Z-height. Generally, as housing thickness decreases thermal constraints limit processing component performance due to less efficient rejection of excess thermal energy. Reduced housing thickness also increases the difficulty of including high performance components due to the reduced housing interior. For example, portable information handling systems often include a variety of wireless devices and antennae; where housing size is minimal, less room is available to deploy the antennae, which can increase wireless interference and hurt wireless signal transmission and reception. As another example, portable information handling systems are often used to present multimedia information, such as movies and music; where housing size is minimal, insufficient room exists to integrate a high quality speaker, particularly in lower audio tones that tend to need larger speaker volumes for high quality sound.

Another difficulty with low profile portable information handling systems is that thinner housings tend to be less robust and more susceptible to failure. Typically, portable housings are tested by repeated cycles of usage, such as repeated opening and closing of housing portions. To reduce housing thickness and weight, some manufacturers have moved towards more exotic materials, such as ceramics. One example of a material that offers aesthetically-pleasing and robust qualities is a glass ceramic material. Glass ceramic material has gained acceptance as a hardened clear cover placed over a display, especially in portable tablet and phone devices that are susceptible to dropping and breaking. One commercial product is Gorilla Glass by Corning, which provides a hardened transparent material that resists breakage. Glass ceramics offer advantages as a housing material in addition to use as a glass cover, although glass ceramics do not conduct or current heat very readily, which can introduce difficulties with thermal management, wireless signal management and other system functions.

SUMMARY OF THE INVENTION

Therefore, a need has arisen for a system and method which integrates a wireless charging coil with an information handling system housing.

In accordance with the present invention, a system and method are provided which substantially reduce the disadvantages and problems associated with previous methods and systems for integrating a wireless charging coil into an information handling system housing. A wireless charging coil and coil interface traces integrated in opposite sides of a glass housing communicate through conductive material disposed in through glass via openings and terminate with conductive contacts to pogo pins of a printed circuit board assembly interfaced with a charger. In one example embodiment, the coil interface traces and conductive contacts overlap a logo etched into the glass housing.

More specifically, a portable information handling system processes information with processing components disposed in portable housing, such as a processor and memory that operate on direct current power. In one example embodiment, a main housing is formed from a planar glass ceramic piece and a plastic case coupled to the glass ceramic interior side. Wireless charging coils integrate in the glass ceramic interior side and coil interface traces integrate in the glass ceramic exterior side so that current provided through the wireless charging coils is communicated to the coil interface traces and then to conductive contacts by conductive material disposed in through glass via openings. A printed circuit board assembly aligns the pogo pins with the conductive contacts through bosses formed in the plastic case and communicates power received from the wireless charging coils to a charger of the information handling system. Cooling channels formed between the glass ceramic interior and the plastic case provide cooling airflow to cool the wireless charging coil and may interface with through glass via openings to exhaust heated air. In one example embodiment, the coil interface traces and conductive contacts co-locate with a logo to blend into the housing.

The present invention provides a number of important technical advantages. One example of an important technical advantage is that a glass ceramic housing integrates wireless charging in a low profile configuration with an aesthetically pleasing appearance. A printed circuit board assembly having pogo pins aligned with conductive contacts of the glass ceramic housing provide a reliable interface for communicating power from the wireless charging coil to processing components of the information handling system. Blending the wireless charging coil interface traces into an etched logo at the glass housing exterior surface for supporting wireless charging coils integrated in the housing interior surface allows coordination of charging across multiple charging coils that may be hidden from external viewing with a treatment at the housing interior surface. The power transfer is provided with cooling of the wireless charging coils through cooling channels and through glass via openings.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A portable information handling system housing of a glass ceramic material integrates wireless charging at a bottom surface that communicates with processing components through pogo pin contact at the housing interior surface. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
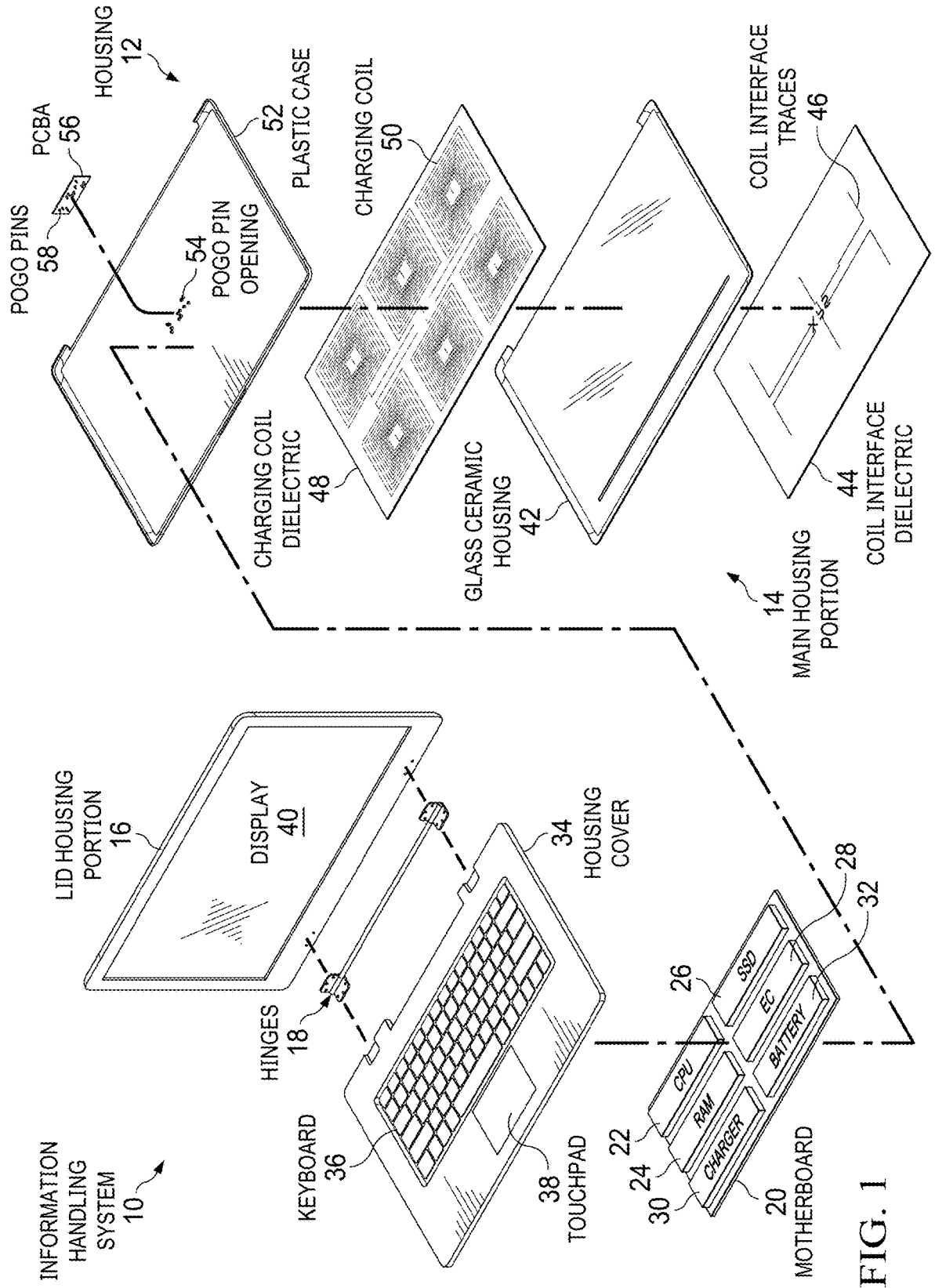
FIG. 1 depicts an exploded perspective view of a portable information handling system having a wireless charging coil integrated in a glass ceramic housing.

Referring now to FIG. 1, an exploded perspective view depicts a portable information handling system 10 having a wireless charging coil integrated in a glass ceramic housing 42. In the example embodiment, information handling system 10 is built in a housing 12 having a main housing portion 14 rotationally coupled to a lid housing portion 16 by a hinge 18 to have a convertible configuration that translates between closed and open positions. Alternative embodiments may include tablet information handling systems having a planar housing or other types of housing arrangements. Main housing portion 14 houses processing components that cooperate to process information. For instance, a motherboard 20 coupled to main housing portion 14 interfaces a central processing unit (CPU) 22 that executes instructions to process information with a random access memory (RAM) 24 that stores the instructions and information. A solid state drive (SSD) 26 or other persistent storage device stores the information and instructions during power down periods, such as an operating system and applications that execute on CPU 22 to generate information. An embedded controller 28 interfaces with CPU 22 to manage system operations, such as power application and thermal restraints, and to coordinate interactions with input devices. A charger 30 interfaces with embedded controller 28 to manage a charge and discharge of a battery 32 that provides direct current power to the processing components. A housing cover 34 couples over main housing portion 14 to support a keyboard 36 and touchpad 38 that accept end user inputs for communication with embedded controller 28. A display 40 integrates in lid housing portion 16 to present visual information as visual images, such as after a graphics processor further processes information of CPU 22 to define pixel values.

In the example embodiment, main housing portion 14 integrates a wireless charging capability that accepts wireless power transfer from an external wireless charger when housing 12 is placed on the external wireless charger. A planar glass ceramic housing 42 is formed from a glass ceramic material, such as Gorilla glass by Corning. Glass ceramic material provides a hardened transparent glass with a polycrystalline structure produced by controlled crystallization of base glass to adapt properties of both glass and ceramic. In alternative embodiments, other housing materials may be used to include ceramic materials and glass materials more generally defined to include common glass. Generally, to provide wireless charging capabilities a dielectric housing material is desirable and glass ceramic has been shown to support wireless power transfer effectively, as is explained in the article: corning.com/gorillaglass/worldwide/en/glass-is-better-for-wireless-charging.html. In the example embodiment, integrating wireless charging coils 50 in a charging coil dielectric 48 that couples to the interior side of glass ceramic housing 42 allows charging coils 50 to be hidden from view from external to the system while wirelessly passing power through the glass ceramic material. To interface the plural wireless charging coils 50, coil interface traces 46 integrated in glass ceramic housing 42 provide a current path that has minimal visibility to an external user. As is described in greater depth below, through glass via (TGV) openings formed in glass ceramic housing 42 filled with conductive material, such as copper, communicate current between coil interface traces 46, wireless charging coils 50 and conductive contacts at the housing interior. A plastic case 52 having pogo pin openings 54 couples to the inner surface of glass ceramic housing 52 and provides a coupling material to which printed circuit board assembly 56 couples. Pogo pins 58 of printed circuit board assembly 56 insert into pogo pin openings 54 align with conductive contacts exposed at the interior surface of glass ceramic housing 42. In this manner, printed circuit board assembly 56 interfaces wireless charging coils 50 with charger 30 for application of power to the processing components, such as by charging battery 32. Hardware for converting wireless signals to power may be included on printed circuit board assembly 56 or with charger 30.

Figure 2:
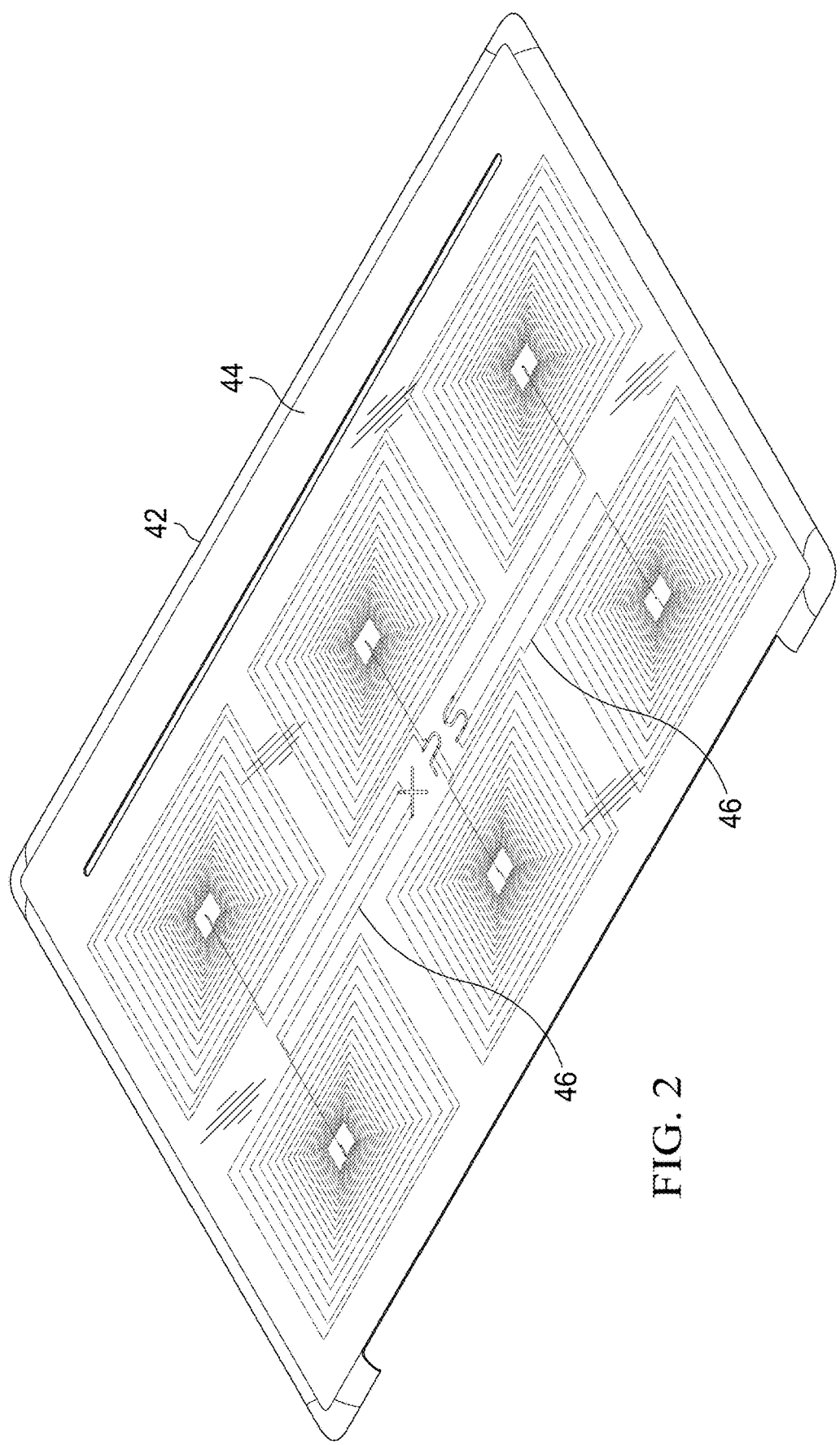
FIGS. 2, 2A and 2B depict a bottom view of main housing portion 14 that illustrates one example of integrated coil interface traces in an outer surface of a glass ceramic information handling system housing.
Figure 2A:
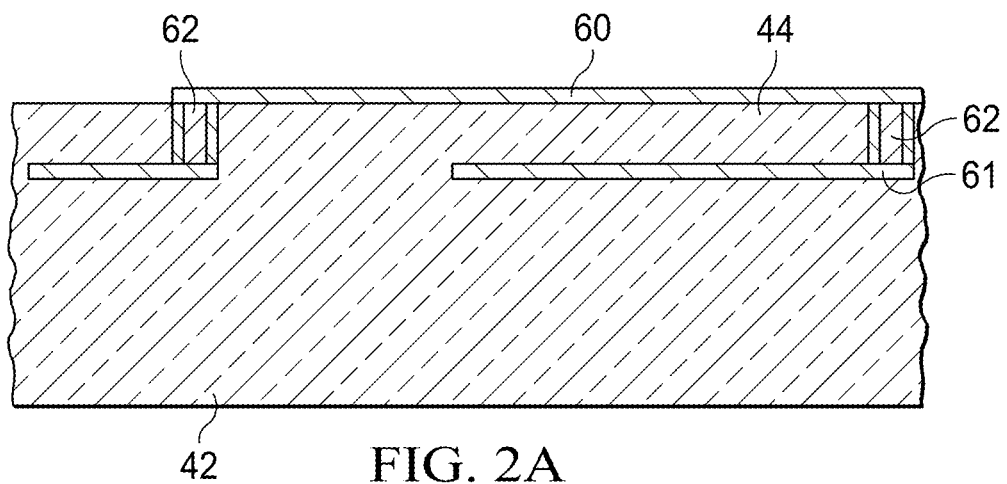
Figure 2B:
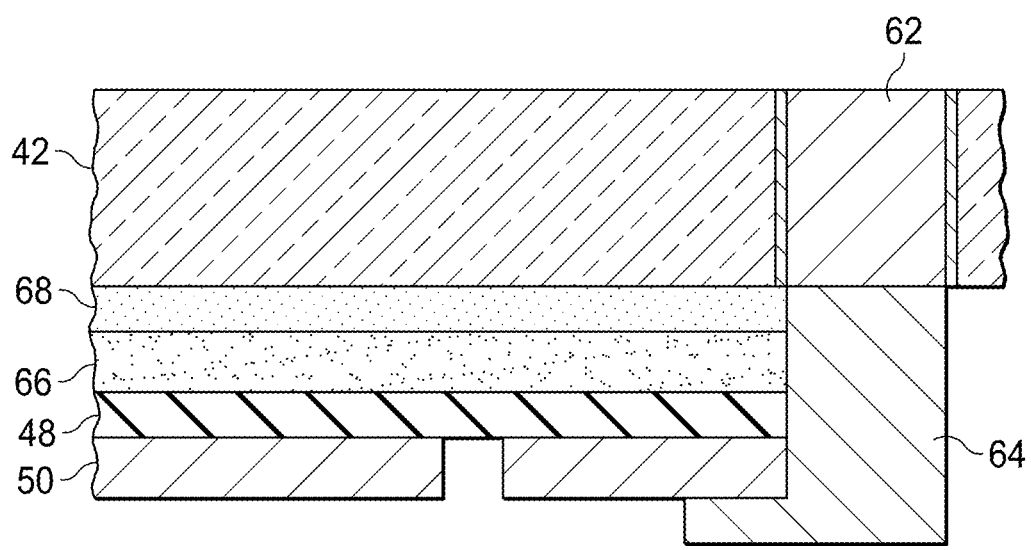
Figure 3:
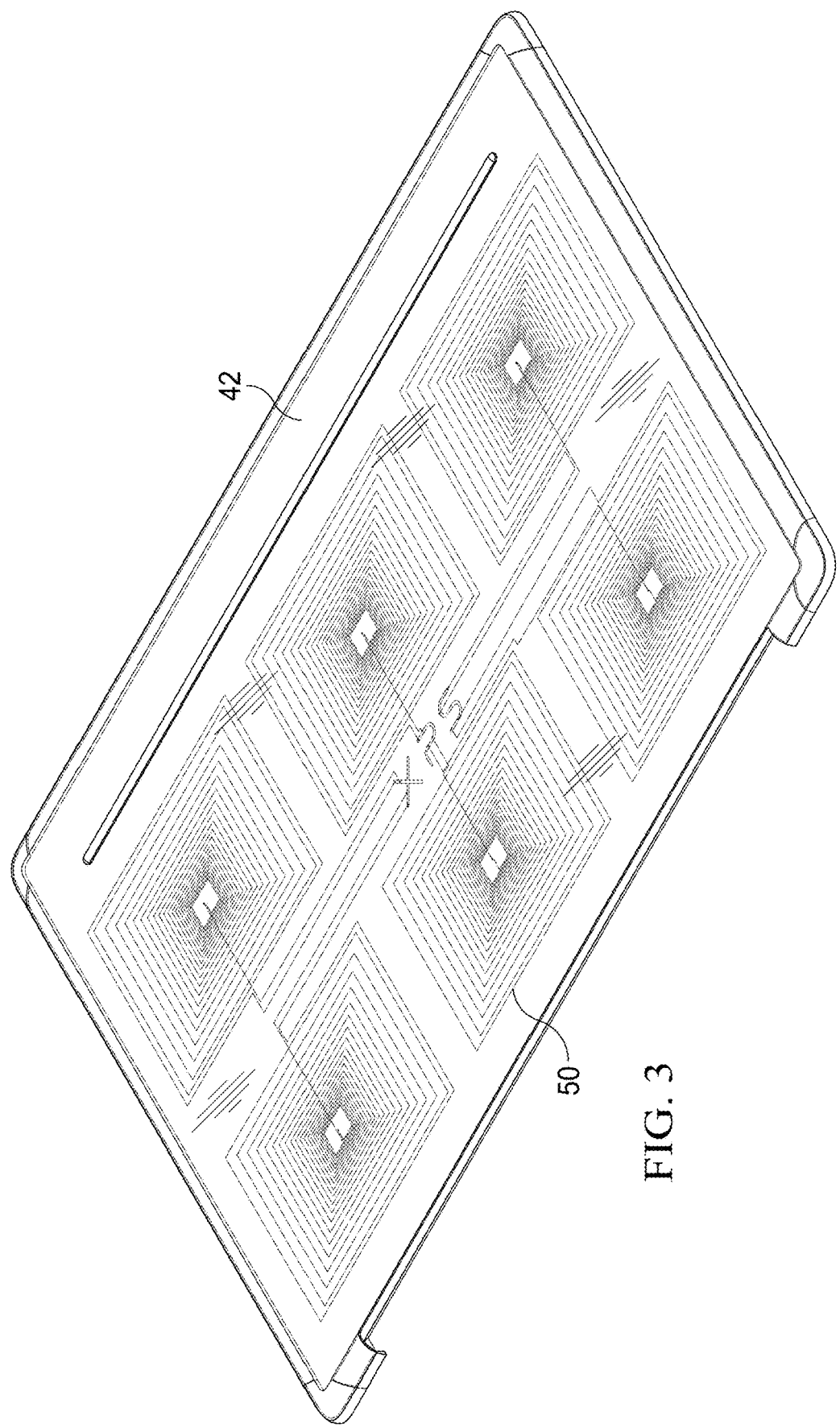
FIGS. 3, 3A and 3B depict a lower perspective view of the glass ceramic housing of an example embodiment having wireless charging coils interfaced with coil interface traces that blend into an XPS logo.
Figure 4:
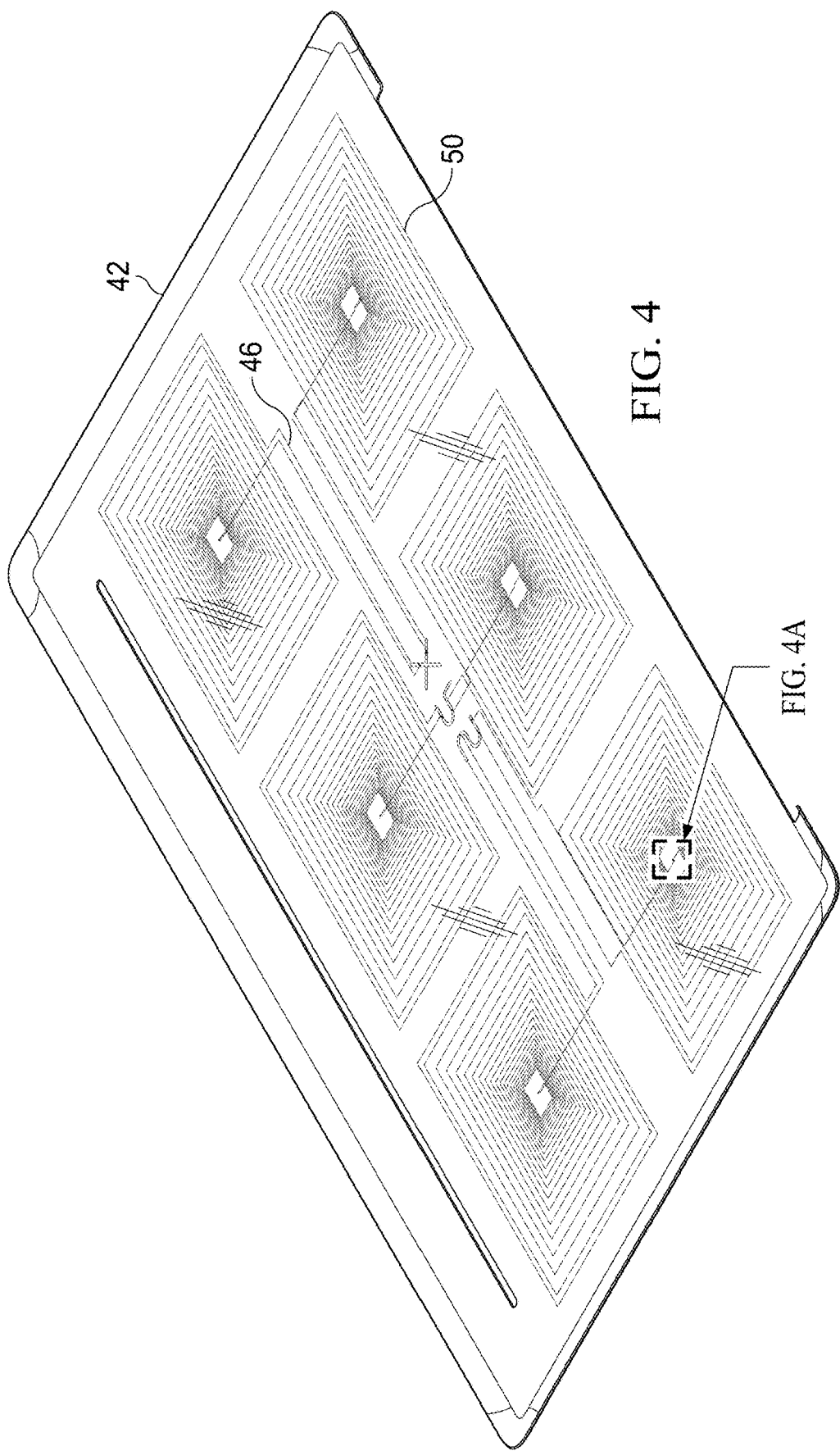
FIGS. 4 and 4A depict an upper perspective view of an example of conductive material in a through glass via to interface wireless charging coils with conductive contacts.

Referring now to FIGS. 2, 2A and 2B, a bottom view of main housing portion 14 illustrates one example of integrated coil interface traces 46 in an outer surface of a glass ceramic housing 42. FIG. 2 depicts a bottom perspective view of main housing portion 14 having coil interface dielectric 44 with integrated coil interface traces 46 coupled to it, such as with a liquid optically clear adhesive. Coil interface traces 46 blend in with an XPS logo associated with the XPS product sold by DELL INC., as depicted in FIGS. 3 and 4. FIG. 2A depicts a sectional side view of glass ceramic housing 42 with coil interface dielectric 44 integrating coil interface traces 46 as both inside coil traces 61 and outside coil traces 60 interfaced by through glass via conductive material 62. FIG. 2B depicts a sectional side view of glass ceramic housing 42 having wireless charging coil 50 integrated in a transparent charging coil dielectric 48 that couples to glass ceramic housing 42 with an optically clear adhesive 66. In the example embodiment, a silk screen layer 68 or other opaque treatment disrupts viewing of wireless charging coils 50 from external to glass ceramic housing 42. A through glass via conductive material 62 and a redistribution layer conductive material 64 provide a conductive path from wireless charging coil 50 upwards to coil interface traces 46. As an example, a silver alloy is used to form traces of the charger coil and interfaces with a photolithography process, and through glass via openings are created in glass ceramic material to accept copper or other conductive material. In photolithography, a silver alloy trace of 0.2 micrometers is first etched on a glass, which is then deposited on a 40 micrometer thick transparent dielectric to create a semi-invisible film. A 100 micrometer thick optically clear adhesive is applied to the glass ceramic and the silver alloy traces are interfaced to the conductive material in the through glass via openings with a redistribution layer (RDL) process to deposit copper to complete the circuit. In one alternative embodiment, some or all of the wire traces may be etched or deposited directly to the glass ceramic material. In the example embodiment, the result is a set of six wireless charging coils on an interior side of glass ceramic housing 42 that route through coil interface traces 46 on the exterior side of glass ceramic housing 42 to a central location where exposed conductive contacts formed the interior side can interface with pogo pins of the printed circuit board assembly.

Figure 3A:
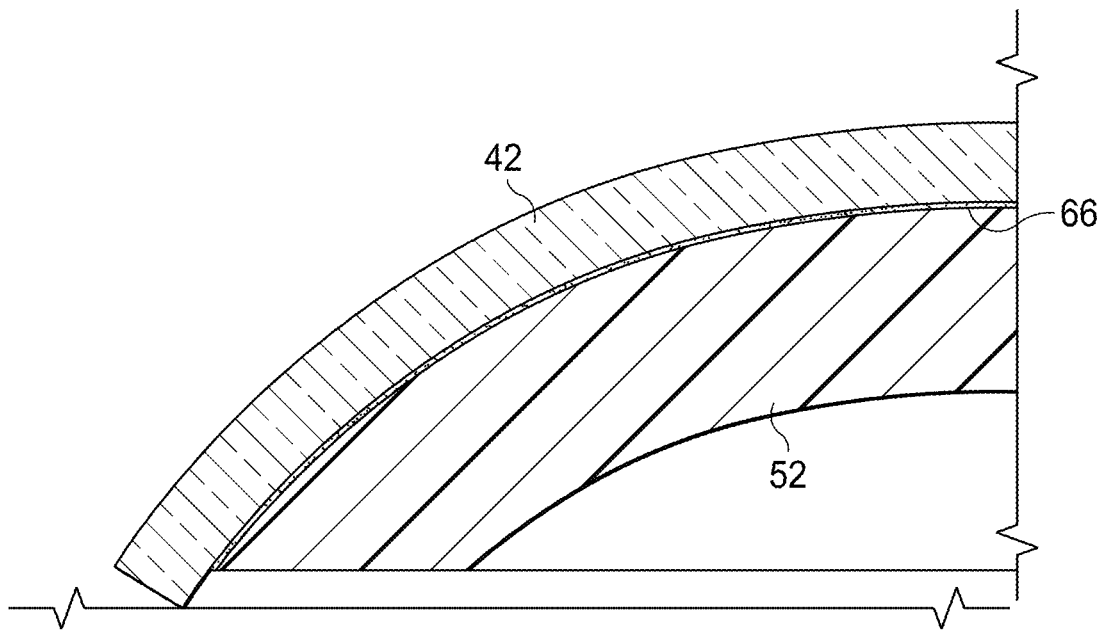
Figure 3B:
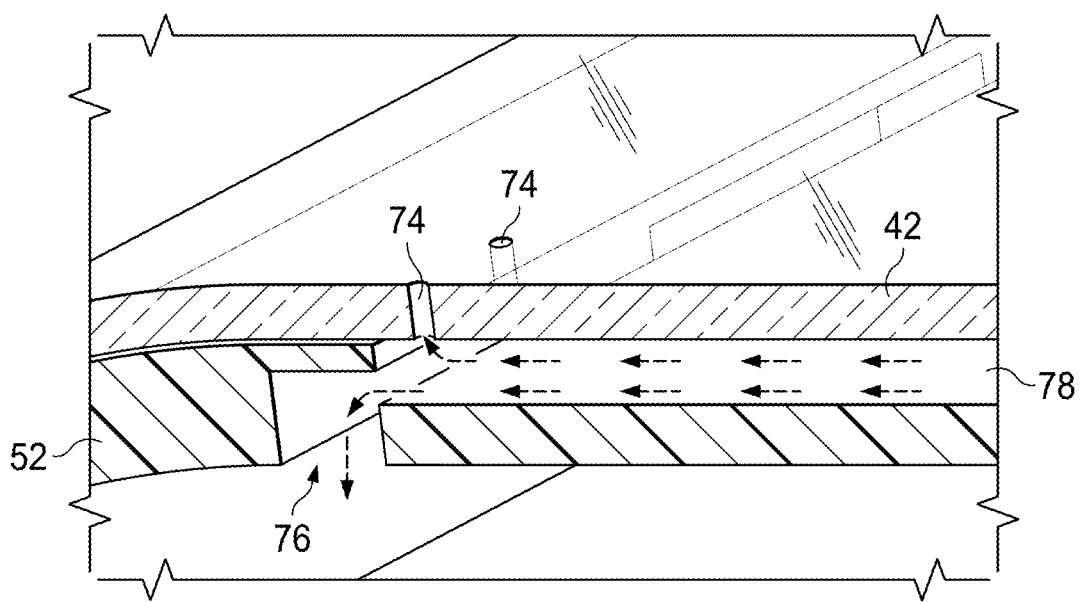

Referring now to FIGS. 3, 3A and 3B, a lower perspective view of the glass ceramic housing 42 depicts an example embodiment having wireless charging coils interfaced with coil interface traces that blend into an XPS logo. In the example, wireless charging coils 50 are visible but located at an interior surface against plastic case 52. Coil interface traces 46 run through the XPS logo to interface each of the plural coils with a central location of the glass ceramic housing where the pogo pins make contact on the interior side. As stated above, if an opaque treatment is applied before application of the coil interface dielectric, wireless charging coils 50 may appear substantially invisible while an etched glass XPS logo and coil interface traces 46 provide a decorative appearance. FIG. 3A depicts a side sectional view of plastic case 52 coupled to glass ceramic housing 42 with a liquid optically clear adhesive 66. In alternative embodiments, other types of case materials and adhesives may be used. FIG. 3B depicts a section side view of one example embodiment of plastic case 52 having cooling channels 78 defined along glass ceramic housing 42 to draw cooling airflow next to the wireless charging coil for reducing thermal conditions relative to charging. The airflow may be forced by passive convection or with an active cooling fan to exit into the housing at a slit 76 and out of the housing a through glass via openings 74 that vent out heated air.

Figure 4A:
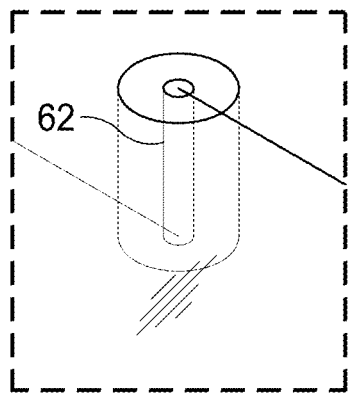

Referring now to FIGS. 4 and 4A, an upper perspective view depicts an example of conductive material in a through glass via to interface wireless charging coils with conductive contacts. In the example embodiment, each wireless charging coil 50 has a conductive material 62 in a centrally located through glass via to provide a conductive path between the upper and lower surfaces of glass ceramic housing 42. Communicating the wireless charging signals from the center of the wireless charging coil to the logo location at the outer surface prevents overlap with wire traces of the wireless charging coil. In one example embodiment, a trace at the end of each wireless charging coil may run to the logo location on the inner surface where no overlap occurs with other traces of the wireless charging coil. Alternatively, each wireless charging coil may terminate on the interior surface at a conductive through glass via to route to the central location as a decorative and functional trace. Allocation of traces to interior and exterior sides may be made based on both functional routing goals and aesthetic appearance goals.

Figure 5A:
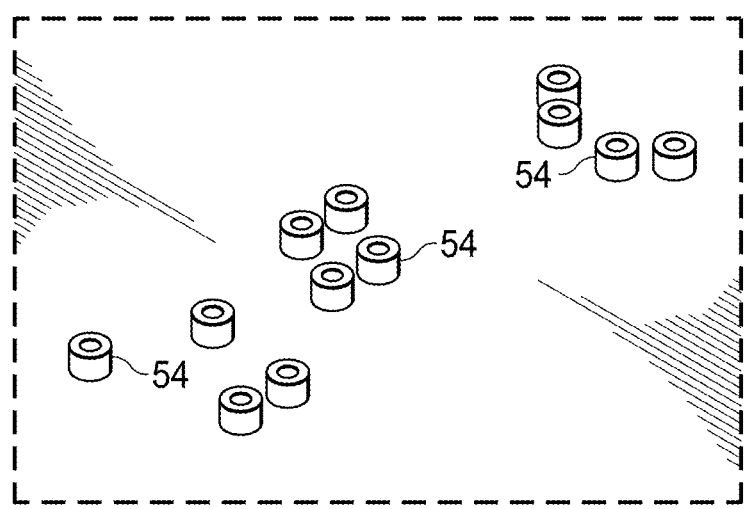
FIGS. 5 and 5A depict a sectional upper perspective view of an example of a plastic casing that couples to the interior side of the glass ceramic housing to accept the printed circuit board assembly.
Figure 5:
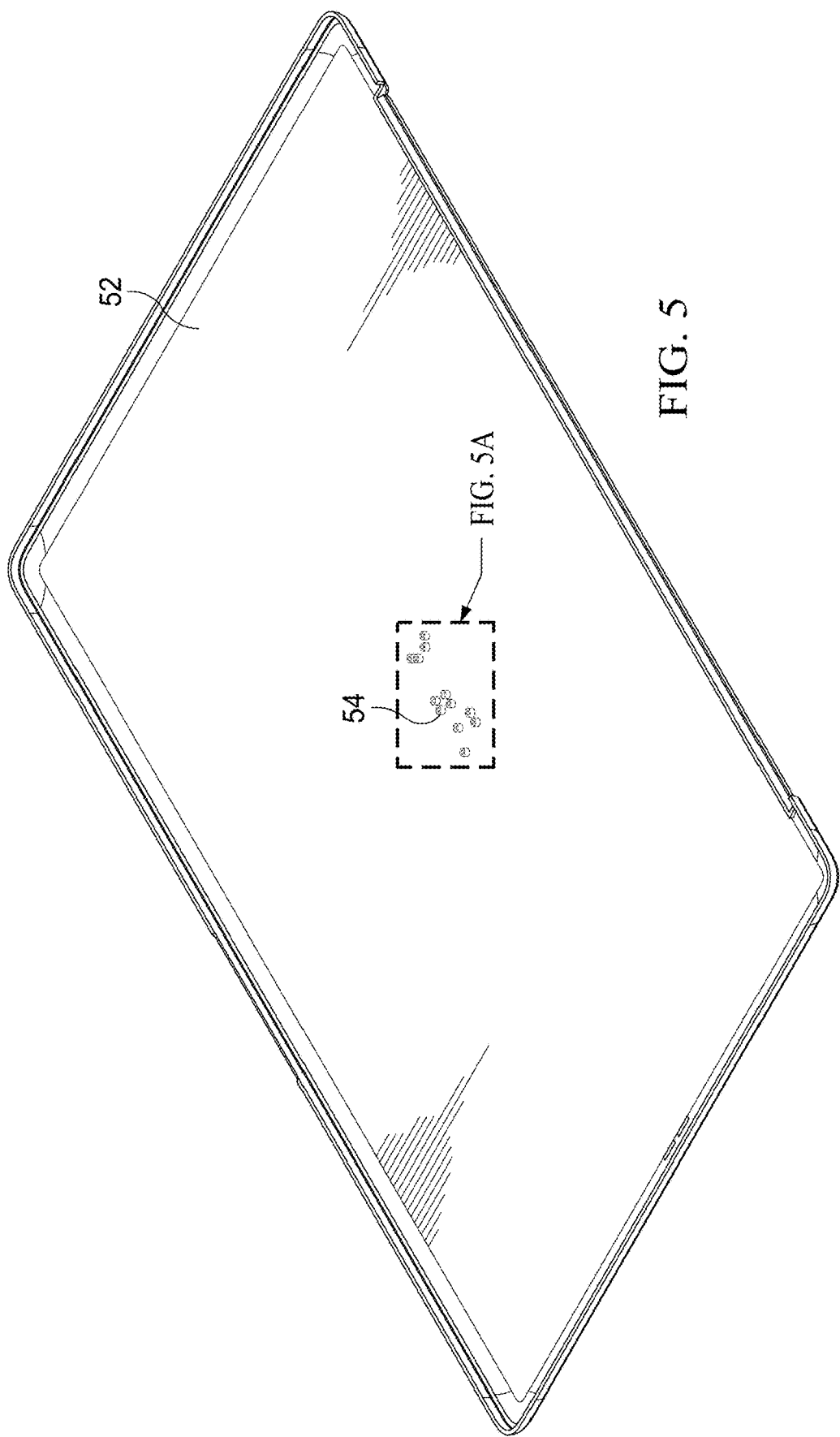

Referring now to FIGS. 5 and 5A, a sectional upper perspective view depicts an example of a plastic casing that couples to the interior side of the glass ceramic housing to accept the printed circuit board assembly. Plastic casing 52 conforms to the shape of the interior of glass ceramic housing 42 and includes openings that pass through pogo pins to contact the conductive contacts of coil interface traces 46. FIG. 5A depicts that pogo pin openings 54 are formed in plastic case 52 to guide the printed circuit board assembly to correct alignment and accept the pogo pins when printed circuit board assembly is coupled into place.

Figure 6:
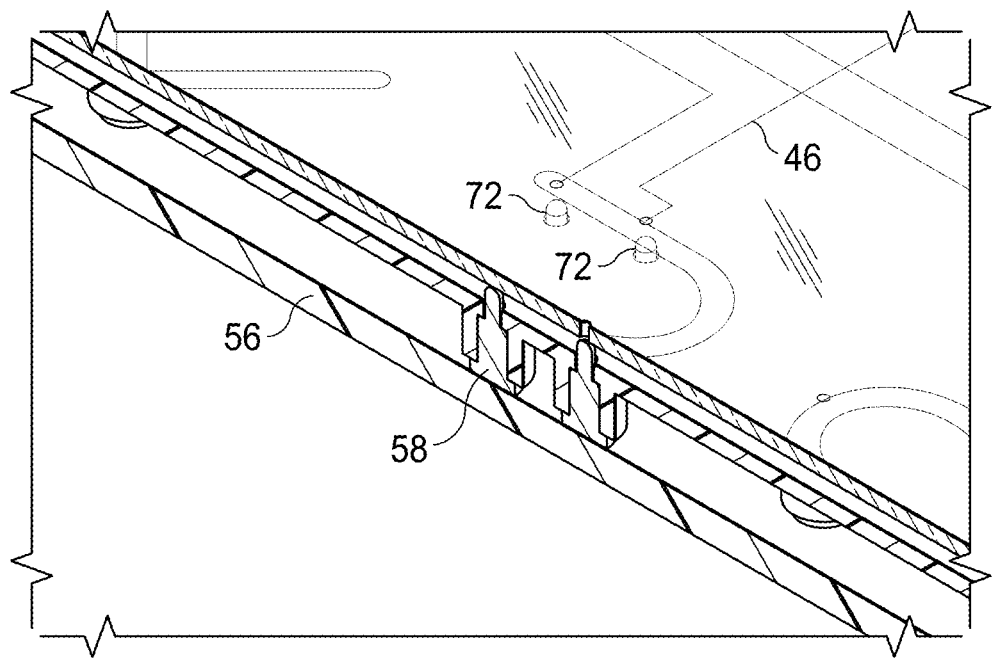
FIGS. 6 and 6A depict a lower perspective sectional view of an example of pogo pin interfaces with conductive contacts of the glass ceramic housing.
Figure 6A:
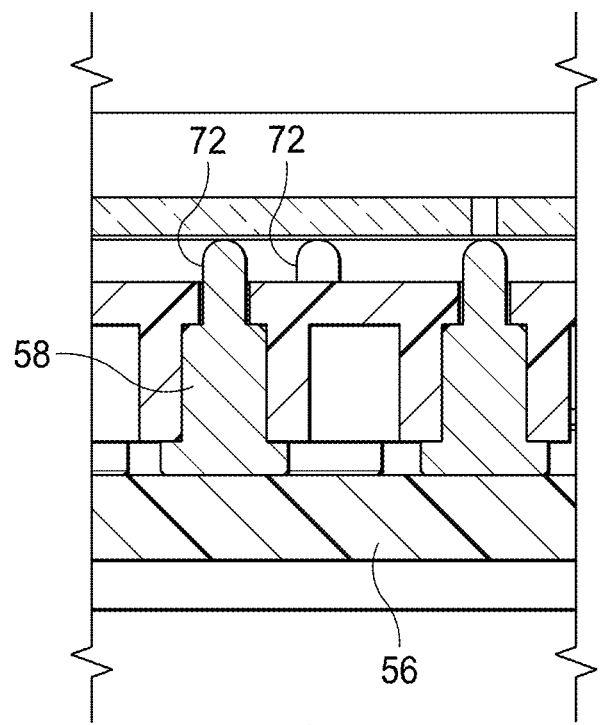

Referring now to FIGS. 6 and 6A, a lower perspective sectional view depicts an example of pogo pin 58 interfaces with conductive contacts 72 of the glass ceramic housing 42. FIG. 6 depicts traces formed in an outer surface of glass ceramic housing 42 that have conductive material, such as copper, in through glass via openings to communicate signals in the outer surface coil interface traces 46 to the inner surface of glass ceramic housing 42 where pogo pins 58 bias against the inner surface. FIG. 6A depicts a sectional side view of printed circuit board assembly 56 holding pogo pins 58 aligned with boss openings of plastic case 52.

Figure 7:
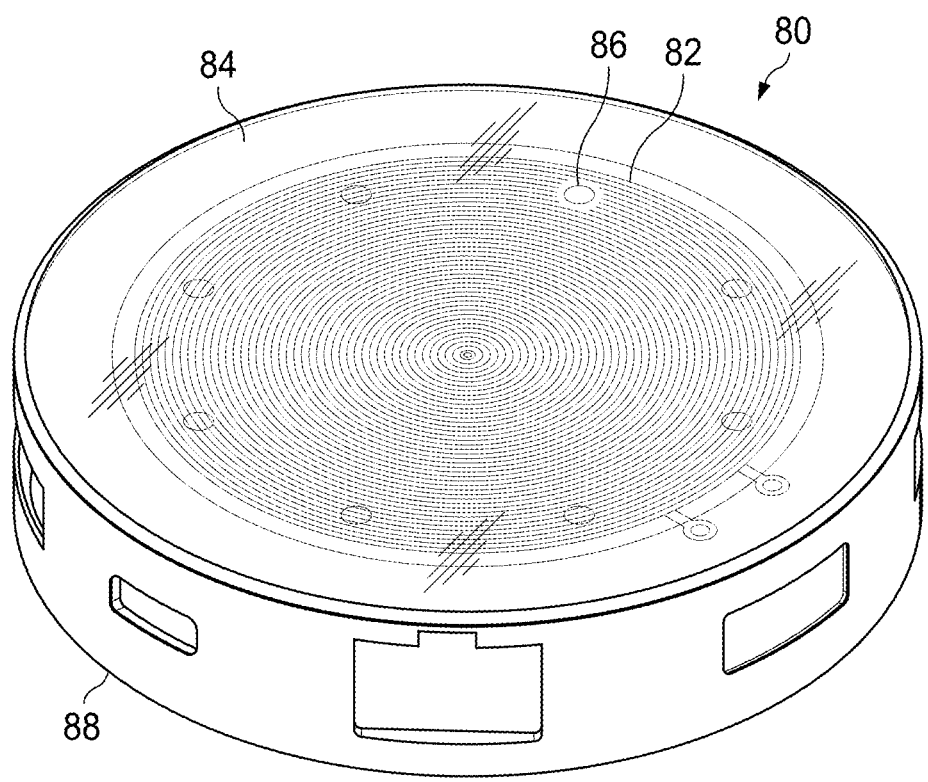
FIGS. 7, 7A and 7B depict an example of a charger 80 that may be used to wirelessly apply power to the information handling system.
Figure 7A:
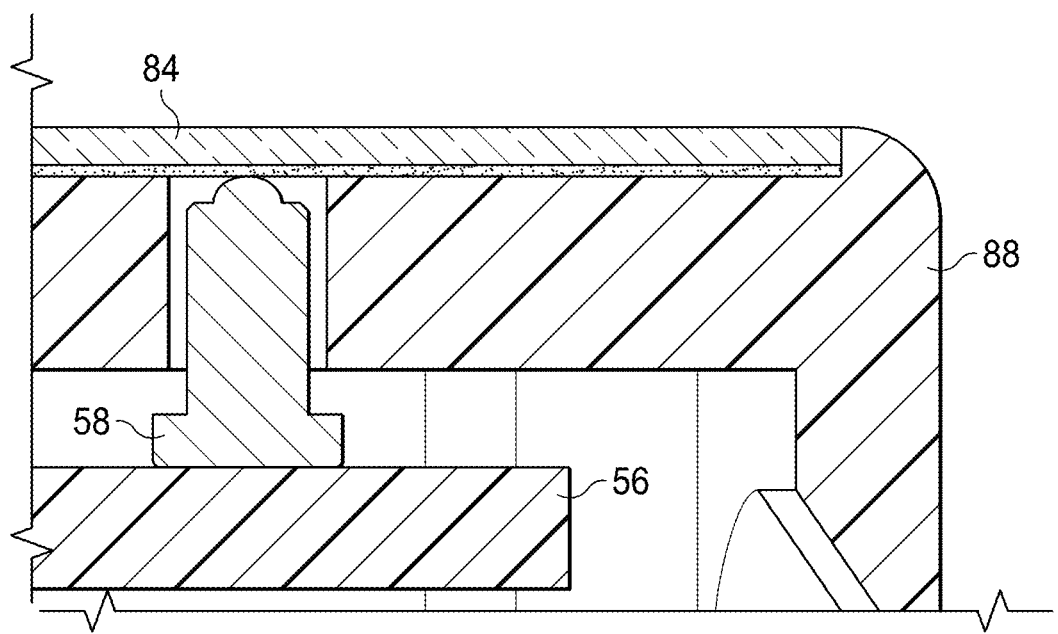
Figure 7B:
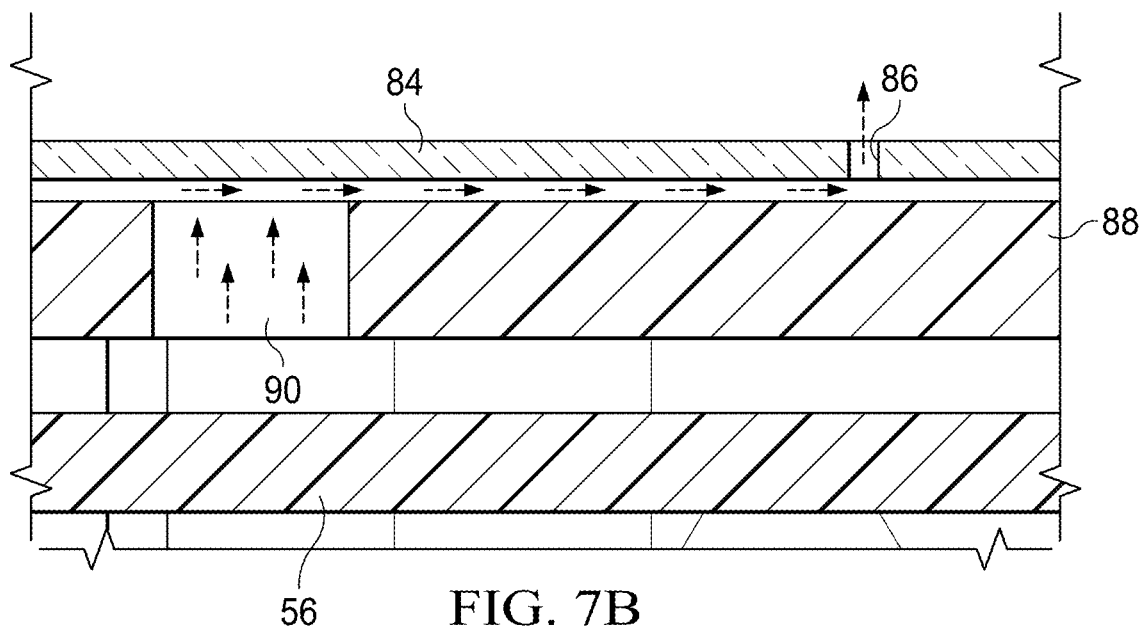

Referring now to FIGS. 7, 7A and 7B, an example depicts a charger 80 that may be used to wirelessly apply power to the information handling system. FIG. 7 depicts a perspective upper view of charger 80 having a glass ceramic upper surface 84 that integrates a charger coil 82. Through glass via openings 86 formed in glass ceramic upper surface 84 provide cooling to reduce excess thermal energy during charging. FIG. 7A illustrates an example of an internal structure within charger 80 to support power transfer. A pogo pin 58 extends up from a printed circuit board assembly 56 to press against a conductive contact of glass ceramic upper surface 84 held in place with a housing top cover wall 88. A silk screening or other treatment at the lower surface hides the underlying components and blends the traces of the charger for a clean appearance. FIG. 7B depicts cooling provided by airflow 90 that passes through the housing of the charger and out the through glass via openings 86.

Figure 8:
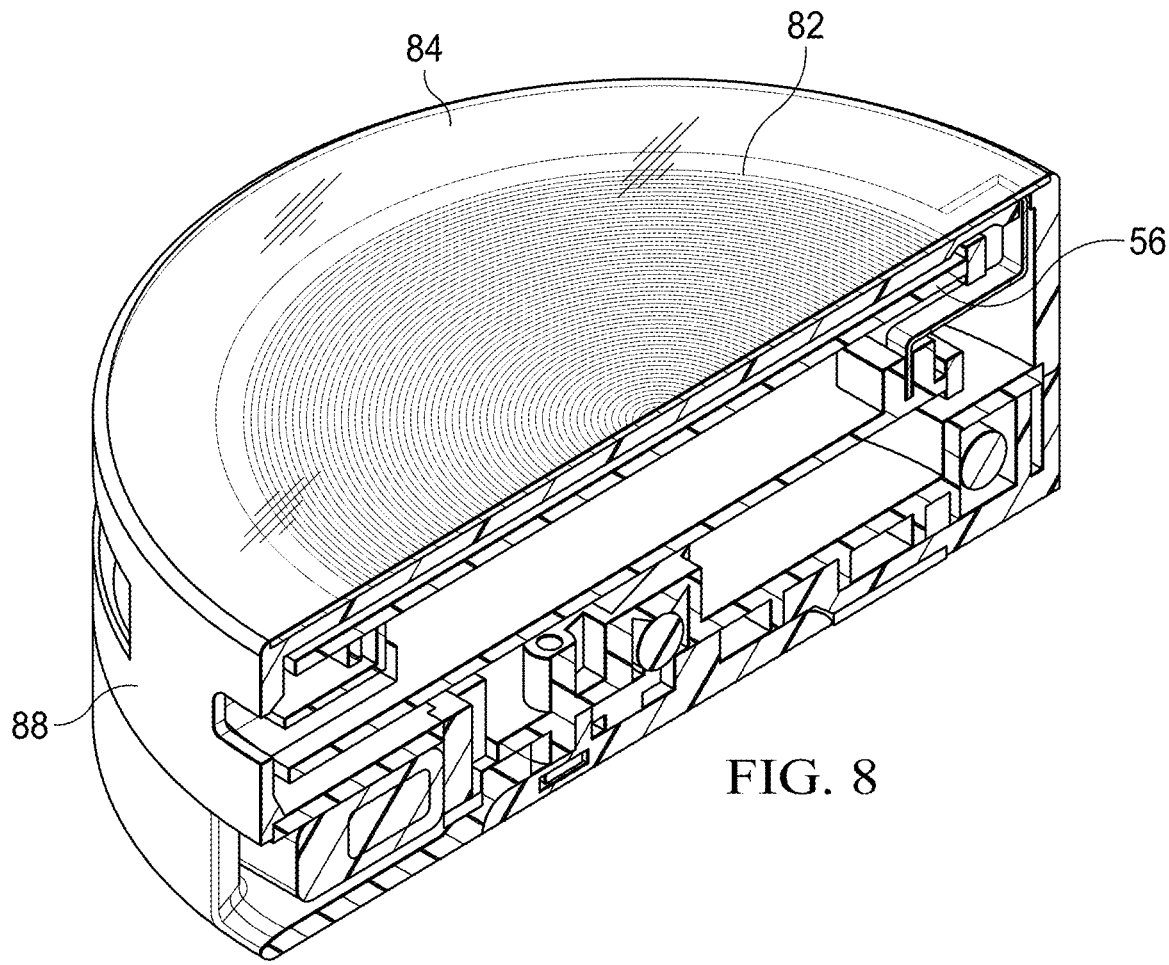
FIGS. 8 and 8A depict the charger configured to transfer power to the information handling system.
Figure 8A:
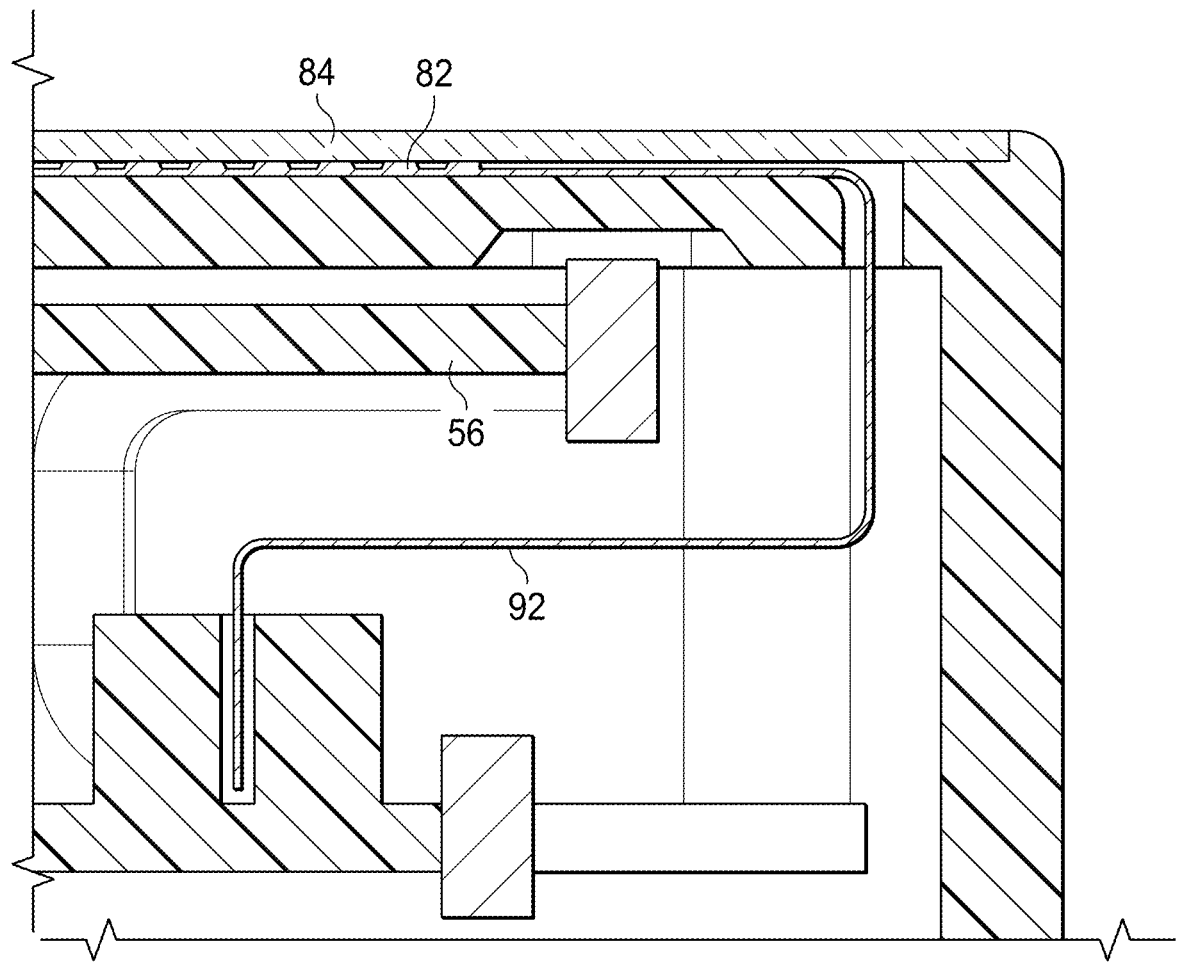

Referring now to FIGS. 8 and 8A, another example depicts the charger 80 configured to transfer power to the information handling system with wireless charging coil 82. Charger 80 includes a variety of other functions, such as to support communications and video. FIG. 8A depicts that a flexible cable 92 interfaces a charger within the housing and the wireless charging coil 82 to provide the wireless charging signal integrated with glass ceramic upper surface 84.

Although the present invention has been described in detail, it should be understood that various changes, substitutions and alterations can be made hereto without departing from the spirit and scope of the invention as defined by the appended claims.

What is claimed is:

1. An information handling system comprising:
   a housing having an interior and an exterior, the housing comprising a glass ceramic material;
   a processor disposed in the housing and operable to execute instructions to process information;
   a memory disposed in the housing and interfaced with the processor, the memory operable to store the instructions and information;
   an embedded controller disposed in the housing and interfaced with the processor, the embedded controller operable to manage power applied to the processor and memory;
   a charger disposed in the housing and interfaced with embedded controller, the charger operable to accept power from an external power source;
   a coil integrated in the housing and configured to accept a wireless charging signal from a wireless charging source disposed external and proximate the coil, the coil having plural exposed conductive contacts; and
   a printed circuit board assembly interfaced with the charger and having plural pogo pins, the printed circuit board assembly coupling to the housing interior to align the plural pogo pins and the plural conductive contacts.

2. The information handling system of claim 1 further comprising:
   a plastic case sized to couple to the housing interior and having plural openings aligned with the exposed conductive contacts;
   wherein the printed circuit board assembly engages the plastic case to insert the pogo pins through the plural openings and against the plural conductive contacts.

3. The information handling system of claim 2 further comprising:
   plural coils is disposed at the housing interior surface;
   plural coil interface traces disposed at the housing exterior surface; and
   plural through glass via conductors interfacing the plural coils and the plural coil interface traces.

4. The information handling system of claim 3 further comprising plural through glass via conductors interfacing the plural coil interface traces and the plural conductive contacts.

5. The information handling system of claim 4 wherein the housing includes an etched logo and the plural conductive contacts are located at the etched logo.

6. The information handling system of claim 3 wherein the plastic case integrates plural cooling channels providing air gaps between the housing interior surface and the plastic case.

7. The information handling system of claim 6 wherein the housing includes plural through glass via aligned to communicate air between the plural cooling channels and the housing exterior.

8. The information handling system of claim 7 wherein the plastic case integrates slits to communicate air between the plural cooling channels and the housing interior.

9. The information handling system of claim 3 wherein:
   the plural coils are formed in a first dielectric coupled to the housing interior surface with an optically clear adhesive; and
   the plural coil interface traces are formed in a second dielectric coupled to the housing exterior surface with an optically clear adhesive.

10. A method for wireless communication of power to an information handling system, the method comprising:
    integrating a coil with a glass housing of the information handling system;
    interfacing plural conductive contacts with the coil, the conductive contacts exposed at an interior side of the glass housing;
    coupling a printed circuit board assembly to the housing interior side to align pogo pins of the printed circuit board assembly with the conductive contacts; and
    wirelessly transferring power to the coil, through the conductive contacts and pogo pins to a charger.

11. The method of claim 10 further comprising:
    integrating a logo on the glass housing exterior side; and
    aligning the conductive contacts with the logo.

12. The method of claim 11 further comprising:
    integrating the coil at the glass housing interior side;
    integrating coil interface traces at the glass housing exterior side; and
    interfacing the coil and coil interface traces with conductive material disposed in through glass via openings.

13. The method of claim 12 further comprising:
    coupling a case to the glass housing interior side;
    coupling the printed circuit board assembly to the case; and
    interfacing the pogo pins with the conductive contacts through openings formed in the case.

14. The method of claim 13 wherein:
the coil comprises plural separate coils; and
the coil interface traces interface each of the plural separate coils to the printed circuit board assembly.

15. The method of claim 10 further comprising:
forming through glass via openings in the glass housing; and
cooling the coil by passing air from the glass housing interior to the exterior through the through glass via openings.

16. The method of claim 15 further comprising:
coupling a case to the glass housing interior, the case defining a cooling channel proximate the glass housing; and
passing the air through the cooling channel and out the through glass via opening.

17. A glass housing comprising:
planar glass ceramic having an interior side and an exterior side;
a case coupled to the interior side;
plural wireless charging coils integrated in one side of the planar glass ceramic;
plural coil interface traces integrated in an opposite side of the planar glass ceramic from the plural wireless charging coils;
conductive material disposed in through glass via openings to interface the plural wireless charging coils and plural coil interface traces; and
conductive contacts exposed at the planar glass ceramic interior side and interfaced with the plural coil interface traces.

18. The glass housing of claim 17 wherein the plural wireless charging coils integrate at the interior side and the plural coil interface traces integrate at the exterior side.

19. The glass housing of claim 17 wherein the plural wireless charging coils integrate at the exterior side and the plural coil interface traces integrate at the interior side.

20. The glass housing of claim 17 wherein the case defines a cooling channel along the glass housing interior and the glass housing includes plural through glass via openings interfacing the cooling channel with the housing exterior.

* * * * *